United States Patent [19]
Caliri

[11] Patent Number: 4,486,371
[45] Date of Patent: Dec. 4, 1984

[54] PRODUCTION OF A DECORATIVE WOOD PANEL WITH SIMULATED WOOD INLAY

[76] Inventor: John S. Caliri, P.O. Box 2083, Sumter, S.C. 29150

[21] Appl. No.: 416,123

[22] Filed: Sep. 9, 1982

[51] Int. Cl.$^3$ .............................................. B29C 17/12
[52] U.S. Cl. ...................................... 264/78; 144/350; 264/162; 264/246
[58] Field of Search .................... 264/73, 74, 162, 246, 264/78; 144/344, 345, 350, 358; 52/312, 313; 428/13, 22

[56] References Cited

U.S. PATENT DOCUMENTS

| | | | |
|---|---|---|---|
| 119,710 | 10/1871 | Hyatt, Jr. | 52/311 |
| 1,862,875 | 6/1932 | Weber | 264/74 |
| 1,947,459 | 2/1934 | Casto | 264/246 |
| 1,988,236 | 1/1935 | Chatfield | 52/312 |
| 2,337,792 | 12/1943 | Yokell | 144/350 |
| 3,683,565 | 8/1972 | Greiner et al. | 264/162 |
| 3,700,533 | 10/1972 | Schmitz | 264/162 |

FOREIGN PATENT DOCUMENTS

| | | | |
|---|---|---|---|
| 1336317 | 12/1963 | France | 52/313 |
| 1382319 | 1/1975 | United Kingdom | 264/162 |

*Primary Examiner*—James Lowe
*Attorney, Agent, or Firm*—L. Lawton Rogers, III

[57] ABSTRACT

A novel decorative panel and method of manufacture in which a wood panel is grooved, the groove filled by synthetic inlay material which is permitted to cure to the approximate hardness of the wood, the entire surface of the panel is thereafter abraded to create a simulated wood grain in the inlay material, and the inlay material thereafter permitted to cure to a hardness greater than that of the wood so that a subsequent polishing operation will remove the scratches from the wood to display the natural wood grain without removing the wood grain simulating scratches from the inlay material.

11 Claims, 5 Drawing Figures

PRODUCTION OF A DECORATIVE WOOD PANEL WITH SIMULATED WOOD INLAY

BACKGROUND OF THE INVENTION

The present invention relates to a decorative panel such as a cabinet door, table top, wall hanging or the like and to a method of manufacturing such a decorative panel. More specifically, the present invention relates to the method of manufacturing a decorative wood panel having a contrasting pattern simulating a wood inlay.

The use of decorative panels for cabinet doors, table tops and the like is well known. By way of example, the 1871 U.S. Pat. No. 119,710 to Hyatt, Jr. illustrates a method of creating an apparent inlay in which a surface is coated, a die is used to selectively depress portions of the surface to form the desired design and then the coating abraded from the undepressed surfaces. Because the coating is not abraded from the depressed surfaces, a contrasting decorative pattern is created. In such a process, the wood grain of the depressed surface is obscured by the coating, or if unobscured by the coating, it lacks contrast because it is part of the same material and thus perfectly matches the wood grain of the undepressed surface.

Another prior art method such as illustrated in the 1902 Webb U.S. Pat. No. 691,214 uses a die to press a desired pattern into blocks of wood having contrasting colors, the two pieces of wood thereafter being placed together intaglio, and the wood thereafter being cut along the line one half the depth of the initial relief in both pieces so that each initial block of wood retains portions of the other. Because of the necessary thickness of the saw blade to cut panels of any substantial size, the depth of the initial relief must be quite substantial and the process is restricted to small tiles.

To obviate many of these difficulties in the inlaying of woods, the prior art has attempted to use materials other than wood to create an inlayed design. For example, the Cameron U.S. Pat. No. 473,185 creates a lattice of wood and forms in situ an easily fusible alloy of metal such as Babbitt metal or solder. A similar process for a synthetic plastic material is illustrated in a Shmitz U.S. Pat. No. 3,700,533. The panels created by such methods produce a planar surface in which the inlay material is devoid of a wood grain and thus does not have the desired appearance of a wood inlay.

It is accordingly an object of the present invention to obviate the deficiencies of the known prior art and to provide a novel decorative panel and method of manufacture in which the inlay is of a synthetic material having the appearance of a wood grain.

It is another object of the present invention to provide a novel decorative panel and method of manufacture having a simulated wood grain inlay molded in situ.

It is a further object of the present invention to provide a novel decorative panel and method of manufacture which may be more fully automated and is relatively inexpensive and rapidly produced.

These and other objects and advantages of the present invention will be apparent from the claims and from the detailed description of the preferred embodiment when read in conjunction with the appended drawings.

THE DRAWINGS

Figure 2:
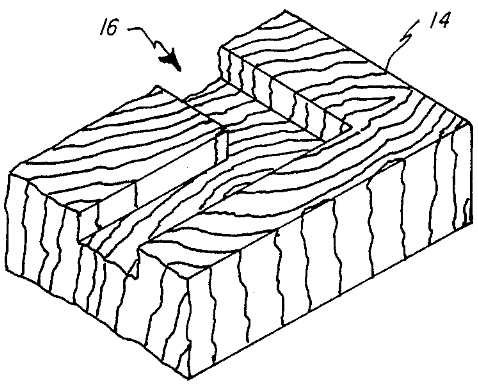
FIG. 2 is a pictorial representation of a wood panel having a groove cut therein as the first step in the manufacturing process.
Figure 3:
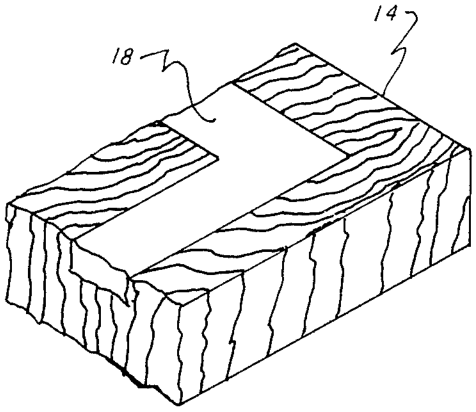
FIG. 3 is a pictorial representation of the wood panel of FIG. 2 having the uncured inlay disposed in the groove as the second step of the manufacturing process.
Figure 4:
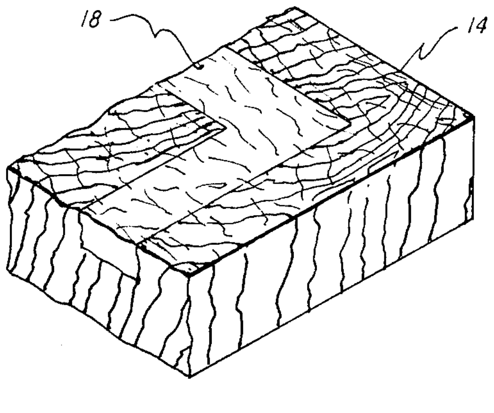
Figure 5:
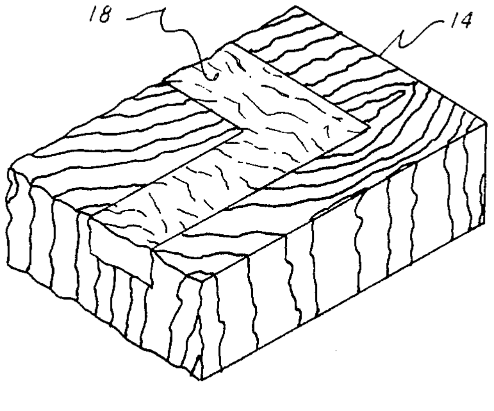

FIG. 4 is a pictorial representation of the wood panel of FIGS. 2 and 3 in which the inlay is partially cured and the entire surface of the panel abraded to provide the wood grain simulating scratches as the third step in the manufacturing process; and FIG. 5 is a pictorial representation of the wood panel of FIGS. 2-4 in which the surface of the panel has been polished after the curing of the inlay material to remove the scratches illustrated in FIG. 4 in the surface of the wood.

THE DETAILED DESCRIPTION

Figure 1:
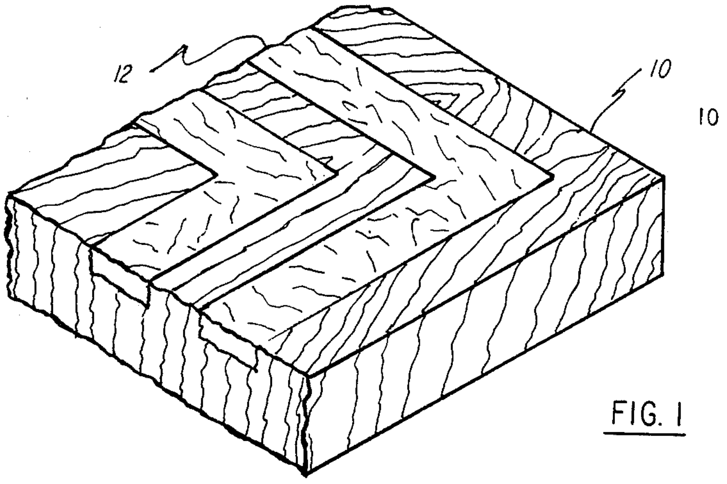
FIG. 1 is a pictorial view of a portion of the panel of the present invention illustrating the simulated wood grain inlay in the surface thereof.

With reference to the drawings, and with particular reference to FIG. 1, the decorative panel of the present invention may take any desired form. The portion of the decorative panel illustrated in FIG. 1 is that of a corner of a rectangular panel such as a table top or the door to a kitchen cabinet. It is, however, to be understood that the panel may take any desired shape and that the pattern therein may also be of any desired configuration. However, it has been found that the width of the inlay must be less than about one inch, preferably about $\frac{1}{8}$ inch, in order to reduce imperfections. It has also been found desirable for the depth of the inlay material to be between about $\frac{1}{2}$ inch and about 1/32 inch, preferably between about 1/16 inch and about $\frac{1}{8}$ inch, to conserve both fill material and time in the filling process.

With continued reference to FIG. 1, the upper surface of the panel 10 may be highly polished to bring out the natural wood grain. The inlay 12 is provided over the entire surface thereof with a series of closely spaced, generally parallel, scratches simulating the open grain of certain woods such as mahogany or oak. The coloration of the inlay may be made to vary considerably through the use of dyes as well as the selection of the wood panel and the staining thereof. Thus, a contrast may be provided in both the grain and the coloration to produce the desired appearance of a wood inlay.

An appreciation of the method of the present invention may be more readily understood with reference to FIGS. 2-5. As shown in FIG. 2, a wood panel 14 may be grooved in the area indicated by the numeral 16 to form the desired panel. This grooving may be accomplished by any suitable conventional means such as a router, saw, die press, or the like. Thereafter, as shown in FIG. 3, the groove 16 may be filled with the inlay material 18 to provide a substantially planer upper surface. Overfilling to accomodate shrinkage in curing may be desirable and will vary with the characteristics of the fill material.

For reasons which will become apparent, the material of the inlay 18 must have an ultimate hardness greater than that of the wood in which it was used and a curing time, at ambient temperature or an elevated temperature less than the combustion point of the wood, of sufficient duration for the next manufacturing step to be accomplished.

At a point when the inlay 18 is cured sufficiently to resist removal from the groove 16, but is of approximately the same hardness as that of the wood 14, the entire surface of the panel may be abraded by any suitable conventional material such as sandpaper, wire brushes, or the like to create closely spaced parallel scratches in the inlay material and thus simulate a wood grain. This same step will of course produce the same scratches in the upper surface of the wood panel as illustrated in FIG. 4. Because "across the grain" scratches are more difficult to remove from the wood, it may be preferable to accomplish this first abrading step in the direction of the wood grain.

Thereafter, and as illustrated in FIG. 5, the inlay material may be permitted to fully cure to a hardness greater than that of the wood and the entire upper surface of the panel polished with a relatively fine abrasive material such as sandpaper to remove the scratches in the wood 14 and to advantageously display the natural wood grain. Because the inlay material 18 is harder when fully cured than the wood 14 in which it is located, the polishing of the wood 14 will not abrade the inlay material 18 and remove the scratches therefrom. Thus, the inlay material 18 will retain the simulated wood grain at the time that the wood is aquiring a polished surface. Of course, additional grain simulating scratches can be made in the inlay material if desired by any suitable tool such as a knife. The wood grain effect may be enhanced when a stain is subsequntly applied to the panel since the scratches in the stain impervious inlay material will retain some of the stain.

Example No. 1: By way of example, a decorative panel was constructed using the teachings of the present invention with a block of wood generally rectangular in shape. This was constructed of glued strips each approximately 24 inches in width and approximately 3/32 inch in thickness with an overall size of approximately 24 inches by 36 inches.

A groove was provided in the upper surface of the panel thus created by means of a router in a generally circular patterns. The width of the groove was a uniform $\frac{1}{8}$ inch and the depth thereof approximately $\frac{1}{8}$ inch. The groove was then overfilled slightly with a synthetic plastic material known as "water putty" available in powdered form from the Donald Durham Company of DesMoines, Iowa, 50304. The natural cream color of the water putty was colored by mixing with a small amount of a vinyl stain or latex paint before filling the grooves so that the material was homogenious in color and contrasted with the birch of the panel.

The inlay material was permitted to dry at a temperature of approximately 70 degrees Fahrenheit for approximately 15 minutes at which time it approximated in hardness the wood with which it was used. The entire surface of the panel was then abraded by a 60 grade sandpaper on a belt sander to produce in both the wood and in the inlay material a series of closely spaced generally parallel scratches simulating the open wood grain of mahogany or oak.

The inlay material was then permitted to cure at a temperature of approximately 70 degrees Fahrenheit for 15 minutes. Thereafter the entire upper surface of the panel was subjected to a polishing process using 80 grade sandpaper on an orbital sander to polish the wood and bring out the natural wood grain. The entire surface was thereafter exposed to a wood stain to enhance the contrast between the wood which absorbed the stain and the color of the inlay material which did not.

Example No. 2: By way of a further example, a decorative panel was constructed using the teachings of the present invention with a solid block of wood generally rectangular in shape with an overall size of approximately $\frac{3}{4}$ inch by 12 inches by 24 inches.

A groove was provided in the upper surface of the block by means of a router and saw in generally straight line with arched corners. The width of the groove was a uniform 3/32 inch and the depth thereof approximately $\frac{1}{8}$ inch. The groove was then overfilled slightly with a synthetic plastic material known as water putty available in powdered form from the Donald Durham Company of DesMoines, Iowa, 50304, and having a natural cream color which contrasted with the oak panel.

The inlay material was permitted to dry at a temperature of approximately 70 degrees Fahrenheit for approximately 15 minutes at which time it approximated in hardness the wood with which it was used. The entire surface of the panel was then abraded by a 60 grade sandpaper on a belt sander to produce in both the wood and in the inlay material a series of closely spaced generally parallel scratches simulating the open wood grain of mahogany. The inlay material was then permited to cure at a temperature of approximately 70 degrees Fahrenheit for 10–15 minutes. Thereafter the entire upper surface of the panel was subjected to a polishing process using 120 grade sandpaper to polish the wood and bring out the natural wood grain.

ADVANTAGES AND SCOPE OF THE INVENTION

The panel of the present invention is a composite wood and synthetic material having a contrast controlled by the coloration of the inlay material and the application of a stain to the wood after the inlay material has cured. The color contrast is enhanced by the simulating of a wood grain in the inlay material and the distinctive natural grain of the wood.

The panel may be of solid wood, particle board, plywood, or strips laminated together prior to providing a decorative pattern for the inlay material.

The pattern may be any desired pattern and great manufacturing tolerances may be permitted in the depth of the groove and its thickness because of the in situ process.

The entire process may be automated with the curing times of the inlay material controlled by temperature and/or inhibitors mixed with the inlay material.

These and many other advantages will be readily apparent to one skilled in the art to which this invention pertains from the claims which are to be accorded in full range of equivalents, the above description being illustrative rather than limiting.

What is claimed:

1. A method of producing a decorative wood panel with a simulated wood inlay comprising the steps of:
(a) providing a wood panel having depressions in the surface thereof;
(b) overfilling the depressions with an inlay material having a shrinkage factor less than the amount of overfill and a hardness when fully cured greater than that of the wood;
(c) curing the material until it has the approximate hardness of the wood;
(d) abrading the surface of the panel to create the appearance of a wood grain in the inlay material by creating scratches therein and to remove any excess inlay material from the surface of the panel thereby providing a generally planar panel surface.

(e) curing the inlay material to a hardness greater than that of the wood; and (f) abrading the surface of the panel to remove the scratches in the wood created during the prior abrading step while leaving the scratches in the inlay material so that the inlay material retains the apearance of a wood grain.

2. The method of claim 1 wherein the inlay material is water putty.

3. The method of claim 2 wherein the first abrading step is a substantially linear abrasion creating substantially straight and substantially parallel lines in the surface of the inlay material.

4. The method of claim 3 wherein the first abrading step is at a substantial angle to the direction of the grain of the wood.

5. The method of claim 4 wherein the second abrading step is a substantially elliptical abrasion.

6. The method of claim 5 wherein the inlay material is stain resistant and including the further step of staining the wood.

7. The method of claim 1 wherein the inlay material is stain resistant and including the further step of staining the wood.

8. The method of claim 1 wherein the depth of the depressions are between about 1/16 inch and about $\frac{1}{2}$ inch and wherein the width of the depressions are between about 1/32 inch and about one inch.

9. The method of claim 8 wherein the inlay material is water putty.

10. The method of claim 1 wherein the angle between the direction of abrading in the first abrading step is generally normal to the direction of the grain in the wood, and the method of claim 4 wherein the second abrading step is a subtantially elliptical abrasion.

11. The method of claim 1 wherein the decorative wood panel produced thereby has a planar surface, said surface being comprised of wood to a first predetermined depth and having a depression therein in a predetermined design, said depression being filled with an inlay material harder than said wood, said material having generally parallel scratches therein simulating an open wood grain and being of a color contrasting with the color of said wood being substantially free of the scratches in said inlay material whereby said predetermined design appears in said surface in a contrasting color and with a simulated wood grain.

* * * * *